United States Patent
Hammes et al.

(10) Patent No.: US 12,420,277 B2
(45) Date of Patent: Sep. 23, 2025

(54) DEVICE AND METHOD FOR PRODUCING INDIVIDUALLY PROCESSED FLUID SAMPLES

(71) Applicant: EIDGENÖSSISCHE ANSTALT FÜR WASSERVERSORGUNG, ABWASSERREINIGUNG UND GEWÄSSE, Dubendorf (CH)

(72) Inventors: Frederik Hammes, Bonstetten (CH); Hans-Ulrich Weilenmann, Winterthur (CH)

(73) Assignee: EIDGENÖSSISCHE ANSTALT FÜR WASSERVERSORGUNG, ABWASSERREINIGUNG UND GEWÄSSERSCHUTZ, EAWAG, Dubendorf (CH)

( * ) Notice: Subject to any disclaimer, the term of this patent is extended or adjusted under 35 U.S.C. 154(b) by 0 days.

(21) Appl. No.: 18/484,416

(22) Filed: Oct. 10, 2023

(65) Prior Publication Data

US 2024/0042426 A1   Feb. 8, 2024

Related U.S. Application Data

(62) Division of application No. 16/480,894, filed as application No. PCT/EP2018/051376 on Jan. 22, 2018, now abandoned.

(30) Foreign Application Priority Data

Jan. 26, 2017   (EP) .................................. 17153208

(51) Int. Cl.
*B01L 3/00*   (2006.01)
*B01F 33/40*   (2022.01)
(Continued)

(52) U.S. Cl.
CPC ............ *B01L 3/502* (2013.01); *B01F 33/406* (2022.01); *G01N 1/38* (2013.01); *G01N 15/1404* (2013.01);
(Continued)

(58) Field of Classification Search
CPC .................. B01L 2300/0867; G01N 2001/387
See application file for complete search history.

(56) References Cited

U.S. PATENT DOCUMENTS 7,851,207 B1   12/2010   Sagripanti
8,808,643 B1   8/2014   Benner et al.
(Continued)

FOREIGN PATENT DOCUMENTS

EP   2711717 A1   3/2014
GB   2450337 A   12/2008

OTHER PUBLICATIONS

Dubelaar et al., "Design and First Results of CytoBuoy: A Wireless Flow Cytometer for In Situ Analysis of Marine and Fresh Waters," Cytometry, 1999, 37, pp. 247-254.
(Continued)

*Primary Examiner* — Natalia Levkovich
(74) *Attorney, Agent, or Firm* — Bryan D. Zerhusen, Esq.; Nicholas R. Herrel, Esq.; CANTOR COLBURN LLP

(57) ABSTRACT

The present invention is directed to a continuous fluid sample processing device for producing individually processed fluid samples and a method for producing individually processed fluid samples. Moreover, the invention also relates to the use of the device in corresponding methods, in particular in a method for continuously mixing, incubating and analyzing a fluid sample by flow cytometry.

13 Claims, 1 Drawing Sheet

(51) Int. Cl.
  *G01N 1/38* (2006.01)
  *G01N 15/1404* (2024.01)
  *B01F 101/00* (2022.01)

(52) U.S. Cl.
  CPC ... *B01F 2101/2204* (2022.01); *B01L 2300/06* (2013.01); *B01L 2300/0851* (2013.01); *B01L 2300/0867* (2013.01); *B01L 2300/10* (2013.01); *B01L 2400/0475* (2013.01); *B01L 2400/049* (2013.01); *G01N 2001/387* (2013.01)

(56) References Cited

U.S. PATENT DOCUMENTS

| | | |
|---|---|---|
| 2002/0064880 A1* | 5/2002 | Merten .............. B01F 35/8822 422/63 |
| 2002/0192113 A1 | 12/2002 | Uffenheimer et al. |
| 2003/0040105 A1 | 2/2003 | Sklar et al. |
| 2003/0162304 A1 | 8/2003 | Dority et al. |
| 2007/0269345 A1 | 11/2007 | Schiffarth et al. |
| 2008/0154240 A1 | 6/2008 | Shippert |
| 2013/0343149 A1 | 12/2013 | Fox et al. |
| 2014/0087389 A1 | 3/2014 | Heller |

OTHER PUBLICATIONS

Hammes et al., "Cytometric methods for measuring bacteria in water: advantages, pitfalls and applications," Analytical and Bioanalytical Chemistry (2010) 397, pp. 1083-1095.
International Search Report and Written Opinion; International Application No. PCT/EP2018/051376; International Filing Date: Jan. 22, 2018; Date of Mailing: Apr. 6, 2018; 13 pages.

\* cited by examiner

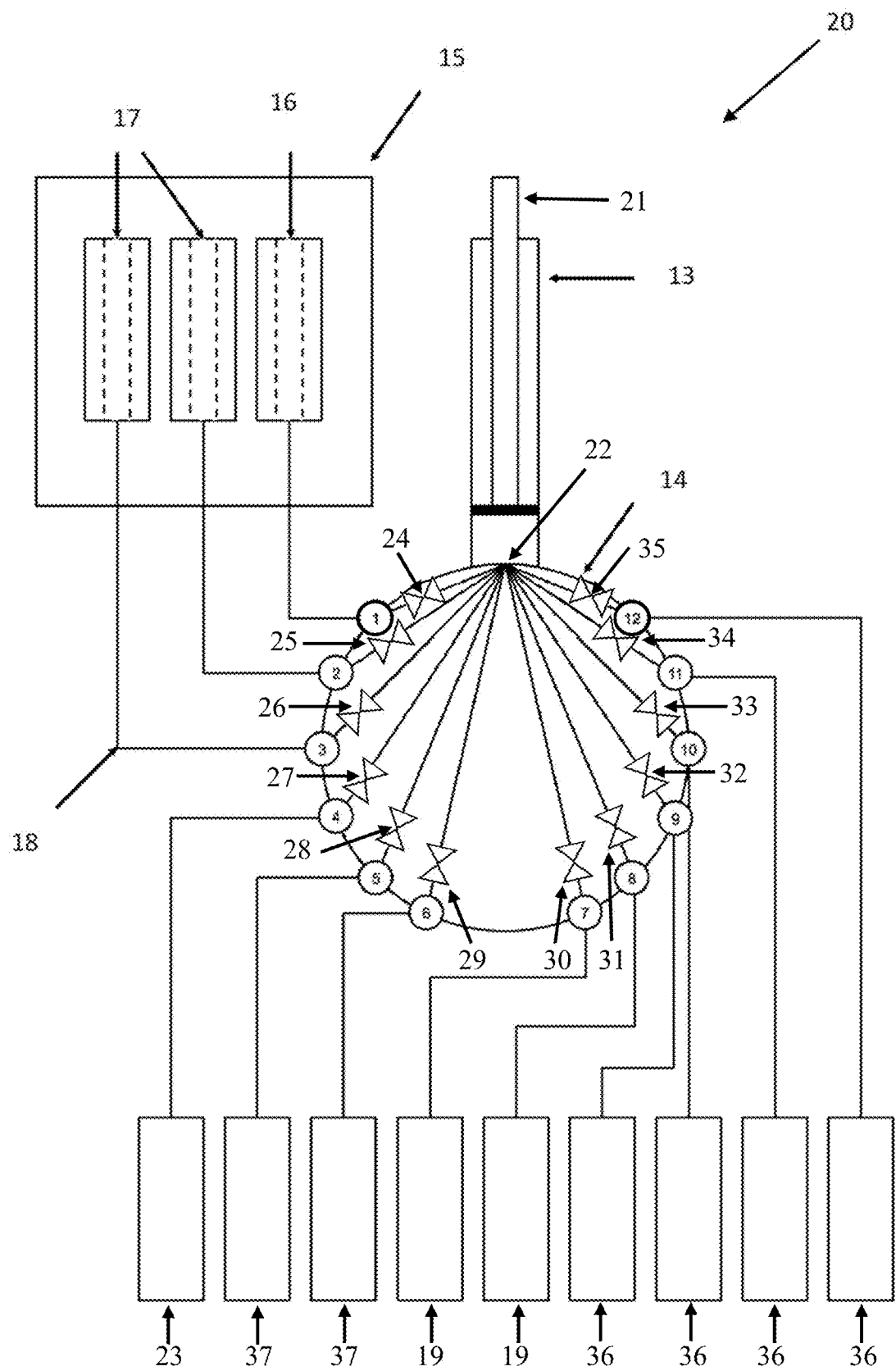

DEVICE AND METHOD FOR PRODUCING INDIVIDUALLY PROCESSED FLUID SAMPLES

RELATED APPLICATIONS

This application is a divisional application of U.S. Non-Provisional patent application Ser. No. 16/480,894, filed on 25 Jul. 2019, which is a National Stage of PCT/EP2018/051376, filed 22 Jan. 2018, titled DEVICE AND METHOD FOR PRODUCING INDIVIDUALLY PROCESSED FLUID SAMPLES, published as International Patent Application Publication No. WO 2018/138023, which claims the benefit and priority to European Application No. 17153208.8, filed on 26 Jan. 2017, all of which are incorporated herein by reference in their entirety for all purposes.

FIELD OF THE INVENTION

The present invention is directed to a continuous fluid sample processing device for producing individually processed fluid samples and a method for producing individually processed fluid samples. Moreover, the invention also relates to the use of the device in corresponding methods, in particular in a method for continuously mixing, incubating and analyzing a fluid sample by flow cytometry.

Conventional flow cytometry has been adapted for water sample analysis (Hammes, F. & Egli, T. Anal Bioanal Chem (2010) 397: 1083) and analyses that do not require staining of the sample, e.g. addition of dyes, are available as automated devices (Dubelaar B. J., Gerritzen P., Beeker A. E. R., et al. Cytometry 1999; 37:247-254). In the fields of fluid analysis, flow cytometry and microfluidic mixing, several devices are known in the art for drawing and mixing samples with processing agents (EP 2 711 717 A2) such as dyes, for example, for use in systems for analyzing fluorescently tagged particles (US 2007/0269345 A1), for mixing water and sheath fluid in flow cytometry (US 2013/0343149 A1), for use in fluid-handling systems for analytical instruments (US 2002/0192113) or as microfluidic mixing apparatuses (US 2003/0040105).

US 2003/0040105 A1 describes the separation of fluid samples in a fluid flow stream by separation gas but is silent on how to efficiently mix the individual samples in the fluid flow with other components or reactants.

US 2014/0087389 A1 discloses a particle detection apparatus comprising a mixing device for mixing a sample with a reaction fluid, and optionally a heating device. The mixing of fluids can be effected in a plunger syringe by a time consuming up and down movement of the plunger. This plunger movement requires an additional void connected to the plunger syringe into which the fluids are pressed when moving the plunger up and down and complicates a continuous sample processing.

Just the same, EP 2 711 717 A2 discloses a detection device wherein the sample and a chemoluminescence activator are contacted in a mixing device, preferably in a pump device.

In summary, the above devices or systems share the drawback that either their use for continuous sample processing is highly limited in sample frequency or that the individual mixing of the samples with the processing fluids is not sufficiently effective for continuous sample processing.

SUMMARY

The object underlying the present invention is the provision of a simple and improved fluid sampling and mixing device. In particular, it is the objective to provide a simple and improved fluid sampling and mixing device for preparing, mixing and optionally processing fluid samples for subsequent analytical assessment, preferably for use in flow cytometry analysis. It is a further objective to provide a device and a method for the efficient continuous sampling, mixing and optionally processing of fluid samples for subsequent analytical assessment, preferably for use in flow cytometry analysis.

In a first aspect, the present invention is directed to a continuous, fluid sample processing device (20) for producing individually processed fluid samples, comprising:
 (i) a syringe plunger pump (13) positioned vertically with a plunger at the top and an opening at the bottom and said opening operably coupled to
 (ii) a multiport pump head (14) configured to connect the syringe plunger pump (13) with
  (a) at least one fluid sample source (19),
  (b) at least one sample processing fluid source (36),
  (c) at least one gas inlet (5, 6),
  (d) at least one outlet (1, 2, 3) for transferring the fluids in the syringe plunger pump (13), preferably to a further device (16, 17), more preferably to a further processing (16) and/or analytical device (16),
  (e) optionally at least one waste fluid exit (4), and
  (f) optionally at least one source for further sample processing fluid(s), rinse fluid, disinfection fluid, and/or cleaning fluid,
wherein the plunger displacement space in the syringe plunger pump (13) forms the mixing chamber for the fluids (a), (b), (f) and gas (d), and
wherein the syringe plunger pump (13) is configured to receive fluids followed by gas, so that the gas forms at least one bubble that floats through the fluids to the top of the syringe plunger pump (13), thus mixing the fluids in the syringe plunger pump (13) and accumulating at the top.

The device of the present invention loads fluid and gas components by means of a syringe plunger pump (13) operably coupled to a multiport pump head (14) and mixes the fluid and gas components at a predetermined ratio, e.g. from 1:100 to 100:1, in the vertically positioned syringe plumber pump (13). Highly efficient mixing of the fluids is achieved by at least one gas bubble, preferably an air bubble, that is loaded into the syringe after the loading of the fluid components and which bubble(s) then rises from the bottom of the syringe to its top, thereby mixing the fluids.

The term "fluid" as used in the present invention relates to any matter, medium, composition or substance that continually deforms or flows under an applied shear stress and includes liquids and gases, preferably liquids. Fluid samples according to the present invention include, e.g., aqueous samples such as water, cell solutions, bacterial solutions, bead solutions, beverages, and/or biofilm samples.

Sample processing fluids as referred to in the present invention include, e.g., markers (e.g., dyes, fluorescent dyes), labels (e.g., antibodies, preferably fluorescently labeled antibodies, beads, quantum dots), chemicals (e.g., EDTA, buffers, bases/acids), and/or dilution media.

In the context of the present invention, the term "syringe plunger pump (13) positioned vertically" means that the syringe plumber pump (13) is positioned in a configuration that allows for the gas bubble(s) to rise from the bottom, i.e. the point of entry of the bubble, to the top of the syringe plunger pump (13). Hence, vertical configuration/positioning preferably also encompasses inclined configurations of the syringe plunger pump (13) that allow for the gas bubble to float upwards. The syringe plunger pump (13) for use in the present invention is not limited to a plunger-comprising syringe but can be any kind of pump that allows for negative pressure to be created in the displacement space of the pump, e.g. by a plunger, a worm conveyer, a spiral pump or a vacuum application device such as a vacuum pump.

The gas for forming the air bubble(s) can be any gas that has suitable properties, e.g. density and chemical composition, for not significantly dissolving in or reacting with the fluid samples and for being lighter/less dense than the fluid sample so that the bubble(s) travels through the fluid sample, mixes the fluids of the sample and is capable of (i) separating from the fluid sample at the top of the syringe plunger pump (13) and (ii) separating individually and sequentially processed fluid samples which are processed through the device. The gas can be e.g. ambient air, oxygen, nitrogen, helium, neon, argon, or carbon dioxide. Preferably, the gas forms a discrete gas bubble, i.e. a bubble clearly separated from the fluid components.

As an example, the volume of the combined fluid samples, preferably for subsequent use in an analytical device, more preferably in a flow cytometry device, that are processed by the device of the present invention can be in the range of 0.01 mL to 10.00 mL, preferably 0.05 mL to 5.00 mL, more preferably 0.10 mL to 1.00 mL. The syringe plunger pump (13) volume in the above device can be in the range of 0.2 mL to 20.0 mL, preferably 0.5 mL to 10.0 mL, more preferably 1.0 mL to 2.0 mL. As an example, the tube diameter for drawing the samples and for transferring the fluids about the device can be in the range of 1 mm to 20 mm, preferably 2 mm to 15 mm, more preferably 4 mm to 6 mm.

As described above, the gas bubble(s), preferably air bubble efficiently mixes the fluid components in the syringe plunger pump (13).

In a preferred embodiment, the continuous fluid sample processing device (20) of the invention is configured so that in use at least one gas bubble spans the whole width of the bottom of the syringe plunger pump (13) before the bubble floats through the fluid components to the top of the syringe plunger pump (13). In other words, at least one of the gas bubbles loaded into the syringe plunger pump (13) displaces the whole width of the bottom of the syringe plunger pump (13) and when the bubble floats to the top it forces the fluid components through a narrow film at the syringe plunger pump's inner walls, thus effecting intimate mixing of the fluid components.

The top of the syringe plumber pump (13) is closed so that the at least one mixing bubble does not exit but can be optionally used for a transfer of the fluid samples into a further device (16, 17). For this transfer, the bubble can serve as a separator, i.e. a plug, that delimits the first mixed fluid sample from subsequent fluid samples that are drawn into the syringe plunger pump (13) in a second or further step. This separation of the mixed fluid samples by the respective bubbles allows for a continuous plug flow of discretely separated mixed fluid samples through the device, preferably through the multiport head pump (14) into further devices (16, 17), e.g. incubation (17), further processing (17, 16), and/or analysis devices (16). In one embodiment, the separation of the fluids by the gas bubbles allows for the plugs of fluid samples to be transferred from the syringe plunger pump (13) to a further device in a loop-type tube that can serve as waiting space for the individual plugs of samples or as an incubator before the plugs of samples are further processed and/or analyzed in a continuous manner.

The term "continuous processing device" as used in the present invention is meant to indicate that the device is suitable and preferably used for processing fluid samples in a continuous or semi-continuous manner (with regular interrupts), meaning that one fluid sample is processed after another, thus resulting in a string or row of at least two consecutively mixed and processed fluid components. For example, the devices of the present invention can be used to sequentially process and monitor fluid samples from rivers, sewage pipes, sewage treatment plants, fluid processing machines, and animal or plant fluids, thereby continually recording gradual or abrupt changes in the fluid sample components and/or properties over time. Of course, the device and all or part of its operating parameters including loading, transfer and timing can be operated automatically, e.g. controlled by a computer. On the other hand, the device of the present invention may also be operated manually or in a batch mode, i.e. non-continually.

In a preferred embodiment, the present invention is directed to a continuous fluid sample processing device (20), wherein the at least one outlet (d) in the multiport pump head (14) is configured to transfer the mixed fluids and the at least one gas bubble sequentially resulting in a row or string of fluid samples separated by gas plugs.

Preferably, the bubble that is transferred together with each processed fluid sample from the syringe plumber pump (13) to a further device (16, 17) can serve to mix the fluid samples in the further device by floating through the fluids and, thus, mixing said fluids in the further device once again.

The transfer means for loading and discharging, e.g. tubing, pipes, etc., the ports of the multiport pump head (14), the syringe plunger pump (13) and any further technical means operably connected to the multiport pump head (14) of the device of the present invention can be rinsed, cleaned, disinfected or otherwise treated by the rinse fluid, disinfection fluid, cleaning fluid, etc., that is loaded into the device by operating the syringe plunger pump (13) and the respective valves (24-35) of the multiport pump head (14), e.g. manually or automatically within determined intervals such as every minute, hour or after each mixing and processing step. Suitable fluids for cleaning and rinsing encompass commonly used detergents, water or deionized water, and hypochlorite solution, preferably comprising 1% active chlorine, 70% ethanol, detergent solutions, buffer solutions, and/or enzyme solutions.

Chemical and biological reactions often require extended reaction times and/or higher temperatures, for example, the attachment of markers to sample components that are to be identified and/or quantified. In one preferred embodiment, the fluid sample is fully processed within the syringe plunger pump. Optionally, the syringe plunger pump (13) can be heated or irradiated to drive the processing reactions of the fluid components. However, an efficient and fast continuous operation of the device of the present invention can be implemented by transferring the thoroughly mixed fluid samples from the syringe plunger pump (13) to some further reaction device(s) (added reaction time outside the syringe plunger pump (13)) or incubation device(s) (17) (added time plus heat).

In a preferred embodiment, the device of the present invention (20) further comprises (iii) at least one, preferably more incubation devices (17), configured to let gas bubbles float to the top and preferably exit the incubation device (17), wherein the incubation device (17) is connected at its bottom to outlet (d) of the syringe plunger pump (13) so that the mixed fluids followed by the gas bubble can be transferred from the syringe plunger pump (13) to the incubation device (17), where the bubble floats, thus mixing the mixed fluids again in the incubation device (17). Most preferably, the incubation device (17) is configured so that in use at least one gas bubble spans the whole width of the bottom of the incubation device (17) before the bubble floats through the fluid components to the top of the incubation device (17).

In a further preferred embodiment, the device of the present invention (20) further comprises (iv) at least one analytical device for assessing physical, chemical and/or biological properties of the processed and optionally incubated fluid samples.

The fluid samples may be analyzed by an analytical device either directly in the syringe plunger pump (13) or after transfer into a further device (16, 17), e.g. into an incubation device (17) or an analytical device (17).

The further device (16, 17), preferably an incubation (17) or analytical device (16), is preferably configured to allow for the floating of gas bubbles through the mixed fluid sample. The further device is preferably open to the environment at the top or comprises a pressure relief valve at the top. This configuration allows for the gas bubble(s) following the respective mixed fluid sample from the syringe plunger pump (13) to travel from the bottom of the device, i.e. the point of entry, through the fluid sample, thus, mixing the sample, to the top of the device where it preferably escapes from the device, e.g. either via an opening or via a pressure relief valve.

Preferably, the open top of the further device, preferably an incubation device, can also serve for retrieving the mixed fluid sample from the device for further analytical processing. Alternatively, the further device, preferably an incubation or analytical device, or the syringe plunger pump (13) can be configured to allow for direct physical, chemical and/or biological analysis, e.g. by photometric means, photo spectrometry, cell counting, mass spectrometry, or microscopy. In a more preferred embodiment of the present invention, the further device, preferably incubation or analytical device, can be a container, e.g. a transparent cuvette, that is suitable for analysis by photometric means.

In a further preferred embodiment, the analytical device for use in the present invention is selected from the group consisting of a photo spectrometer, a mass spectrometer, a microscope, and a cell counter, preferably a flow cytometry device, more preferably a flow cytometry device for stained fluid samples.

In a most preferred embodiment, the continuous fluid sample processing device (20) of the invention comprises at least one, preferably more than one incubation devices (17), more preferably more than one incubation device (17) for parallel incubation of mixed fluid samples, and at least one flow cytometry analytical device for analyzing continuously mixed and incubated fluid samples.

The device of the present invention can also be implemented in a system, preferably an automated system, comprising the device of the present invention, and one or more of the following components selected from the group consisting of an incubation device, preferably a heated incubation device; an analytical device, preferably a flow cytometry device; a further fluid sample processing device; a control unit for controlling the syringe plunger pump (13), the multiport pump head (14), and/or further devices (16, 17), preferably further processing (16), incubation (17) and/or analytical devices (16); a software for instructing the control unit and preferably for instructing and/or communicating with further components of the system, e.g. with an analysis device, preferably a flow cytometer, and for analysis of the data.

In the context of the present invention, the term "automated" means that the device or the system of the present invention in which the device is operable, is operated automatically by means of a routine process that requires no or little manual manipulation, and, which preferably also analyzes the mixed and/or processed fluid samples, more preferably in a continuous process, i.e. by loading, transferring, processing and/or analyzing one sample after the other automatically and continually.

In a second aspect, the present invention is directed to a method for, preferably continually, producing individually processed fluid samples, comprising the steps:
(a) providing the continuous fluid sample processing device (20) according to the present invention,
(b) loading at least one fluid sample through a multiport pump head (14) into a syringe plunger pump (13) of device (20) from an at least one sample source,
(c) loading at least one sample processing fluid through the multiport pump head (14) into the syringe plunger pump (13) of device (20) from an at least one sample processing fluid source (36),
(d) loading at least one gas bubble through the multiport pump head (14) into the syringe plunger pump (13) of device (20) from at least one gas inlet (5, 6), which bubble floats through the fluids to the top of the syringe plunger pump (13), thus mixing the fluids in the syringe plunger pump (13) and accumulating at the top,
(e) transferring the mixed fluids followed by the gas bubble in the syringe plunger pump (13) through an at least one outlet of the multiport pump head (14), preferably to a further device (16, 17), more preferably to a further processing (16) and/or analytical device (16), and
(f) optionally loading a further processing fluid, a rinse fluid, a disinfection fluid and/or a cleaning fluid through the multiport pump head (14) from an at least one optional source.

The steps (a) to (f) in the above method are preferably executed in a sequential order. More preferably, the order of steps (b) and (c) can be changed. It is most preferred that step (d) is performed after steps (b) and (c) are executed.

Any of the above steps can be repeated as often as necessary, e.g. several air bubbles can be loaded into the syringe plunger pump (13) sequentially or at different time points to improve the mixing of the fluid components; and/or several fluid samples and/or sample processing fluids can be loaded into the syringe plunger pump (13) in any suitable order. Also, the transfer step (e) and/or step (f) can be executed at any suitable time during the generation of the individually processed fluid samples.

It is preferred that the above method is executed continually or semi-continually by repeating steps (a) through (f), at least steps (a) to (e), until all fluid samples of interest are processed. Alternatively, the method can be practiced batch-wise, i.e. for individual fluid samples.

In a preferred embodiment, in transfer step (e) of the method according to the present invention, the mixed fluid components followed by the gas bubble are transferred together from the syringe plunger pump (13) to an incubation device (17) configured to allow the floating of the gas bubble through the mixed fluids, thus mixing the fluids again in the incubation device (17), for example, as described above in the context of the device of the present invention. Most preferably, the incubation device (17) for use in the method of the invention is configured so that in use at least one gas bubble spans the whole width of the bottom of the incubation device (17) before the bubble floats through the fluid components to the top of the incubation device (17).

The further device for use in the above method of the invention can be a further device as described above for the device of the present invention.

In a further preferred embodiment, the method of the present invention comprises the further step (g) of assessing physical, chemical and/or biological properties of the processed and optionally incubated fluid samples.

In yet another preferred embodiment, the physical, chemical and/or biological properties of the processed and optionally incubated fluid samples are assessed either within the syringe plunger pump (13), in a sample taken directly from the mixed fluids in the syringe plunger pump (13), or after transfer and further processing, preferably incubation, of the mixed fluids from the syringe plunger pump (13).

In a further preferred embodiment, the assessment of physical, chemical and/or biological properties in the above method is selected from the group consisting of photo spectrometry, mass spectrometry, microscopy and cell counting, preferably flow cytometry, more preferably flow cytometry for stained fluid samples.

In a most preferred embodiment, the method of the present invention comprises continuously mixing, incubating and analyzing a fluid sample by flow cytometry.

In a preferred embodiment, the processing of the fluid samples includes the dilution of the sample with a fluid of choice. For example, the sample processing fluid may be a diluent, e.g. a solvent.

In a third aspect, the present invention is directed to a use of the above continuous fluid sample processing device (20) according to the invention for producing individually processed fluid samples, preferably in the method of the present invention.

BRIEF DESCRIPTION OF THE DRAWINGS

In the following the device and method of the present invention are illustrated by a representative embodiment, none of which are to be construed as limiting the invention beyond the scope of the appended claims.

FIG. 1 depicts a preferred embodiment of the fluid sample processing device (20) of the present invention.

DETAILED DESCRIPTION

| Reference signs used in FIG. 1 | |
|---|---|
| (1)-(4) | Outlet ports |
| (5)-(12) | Inlet ports |
| (13) | Syringe plunger pump |
| (14) | Multiport pump head |
| (15) | Temperature controlled chamber |
| (16) | Further device, such as a flow cytometer |
| (17) | Incubation device |
| (18) | Tubing |
| (19) | Sample, processing and/or gas sources, waste container |
| (20) | Fluid sample processing device |

FIG. 1 depicts a preferred embodiment of the fluid sample processing device (20) of the present invention. The syringe plunger pump (13) is positioned at the top of the multiport pump head (14) in a vertical manner allowing for a gas bubble to float to its top. Syringe plunger pump (13) has an opening (22) at its bottom and is in fluid communication with the multiport pump head (14). The plunger (21) of syringe plunger pump (13) operates in a vertical direction and moves away from the multiport pump head (14) when loading fluids or gases. In this FIGURE, multiport pump head (14) features 8 inlet ports (5) to (12) and 4 outlet ports (1) to (4). The number of ports as depicted in FIG. 1 is not limiting for practicing the present invention and any number of inlet and outlet ports is within the scope of the present invention, as long as there are at least one fluid sample source, at least one sample processing fluid source, at least one gas inlet (5, 6), and at least one outlet for transferring the fluids, e.g. to a further device (16). The ports of the multiport pump head (14) are preferably connected via connecting tubing (18) to incubation devices (17), syringe plunger pump (13) and to the sources, containers, interfaces or exits (19). Upon activation, the syringe plunger pump (13) creates a negative pressure within the plunger displacement space and draws at least one fluid sample and at least one sample processing fluid (36) through the respective ports into the syringe plunger pump (13) followed by a gas bubble. The gas enters the syringe plunger pump (13) at its bottom and preferably spans the whole width of the bottom before it floats through the fluid components to the top of the syringe plunger pump (13), thus mixing the fluids in the syringe plunger pump (13) and accumulating at its top. The displacement of the fluids by the gas bubble(s) forces the fluids to the sidewalls of the plunger displacement space, preferably forming a narrow film when the bubble floats by. Subsequently, the plunger (21) of the syringe plunger pump (13) is moved towards the multiport pump head (14) creating a positive pressure and the mixed fluids followed by the gas bubble are transferred through, e.g., connecting tubing (18), preferably to the bottom of an incubation device (17), more preferably an incubation device (17) configured to allow the floating of the gas bubble through the mixed fluid components. Most preferably, the incubation device (17) is configured so that in use at least one gas bubble spans the whole width of the bottom of the incubation device (17) before the bubble floats through the fluid components to the top of the incubation device (17). In the incubation device (17) the mixed sample fluid components arrive first and the gas bubble follows. In the incubation device (17) the gas bubble then floats through the fluid components from bottom to top, thus mixing the fluids a second time. The incubation devices (17) are either configured to be used for direct, e.g. photometric, analysis or are open at their tops to allow for the sample to be drawn, e.g. by a needle of a flow cytometer (16) interface or any other analytical device (16) such as, for example, described above. Also, the incubation devices (17) can alternatively comprise a pressure relief valve at their tops. Preferably, the incubation devices (17) are located in a temperature controlled chamber (15) that provides for different incubation temperatures depending on the processing requirements of the individual samples.

Example 1

In the following, a representative experimental method for producing individually processed fluid samples according to the present invention is provided. A complete setup for a fully automated, discrete online (i.e. in-situ) flow cytometry experiment included (i) a flow cytometer (e.g. Accuri C6, BD, USA; CytoFLEX, Beckman-Coulter, USA; NovoCyte, ACEA Biosciences, USA) including respective software, (ii) an automated sampling, pipetting, mixing, and temperature controlled incubation unit connected (a) both physically (via the sample acquisition needle) and via software to the flow cytometer, (b) to the system/sample (e.g., flowing water line, batch reactor) to be measured, and (c) to the relevant substance/chemical sources used for sample treatment and system maintenance, (iii) a software suite for operating the different operations of the automated unit (via commands) and triggering start and stop as well as the saving of measured data by the flow cytometer, and (iv) an optional software suite for batch and/or real-time data analysis.

The automation unit comprised as depicted in FIG. 1 (i) a syringe pump (Tecan, Switzerland), which was installed vertically upside-down (13) with a multi-port pump head (14) offering 12 connections (1-12) for thin tubing (18), (ii) a temperature controlled chamber (15), (iii) incubation devices (open or with a pressure release valve on the top) (17), and (iv) a connecting interface chamber to the flow cytometer (16) needle. The syringe pump was connected via the thin tubes fixed to the multi-port head to (a) the incubation chambers, (b) the connecting interface chamber, (c) the system/sample to be measured, and (d) a number of containers comprising relevant substances/chemicals used for sample treatment and system maintenance.

A typical experimental sequence for water analysis consisted of the following steps: (i) 200 µl of sample water from a stream to be monitored for cellular load were introduced from container (19) through the respective thin tube via the multi-port pump head (14) into the syringe pump (13). (ii) The sample was discarded (pre-rinse sample) through the respective thin tube via the multi-port pump head (14) into a waste container (23) and then the sampling step was repeated (measurement sample). (iii) 200 µl of staining solution (SYBR Green, Life Technologies, USA) were drawn from the respective container (36) through the respective thin tube via the multi-port pump head (14) into the syringe pump (13). (iv) Air was drawn through the respective thin tube via the multi-port pump head (14) into the syringe pump (13), resulting in an air bubble forming at and completely spanning the bottom of the upside-down syringe pump (13), where the two previously drawn liquids (water sample and staining solution) were located. As the head of the syringe pump was moving upwards and more air was drawn into the syringe, the air bubble spontaneously floated through the liquids, resulting in mixing of these. (v) The mixed liquid was transferred from the syringe to one of the incubation devices (17) located in the temperature-controlled chamber (15) through the respective thin tube via the multi-port pump head (14) followed by the air previously drawn through the liquids and still captured in the syringe. This resulted in another floating of the air bubble through the liquid in the incubation chamber (17) and thus a second mixing. The air escaped through the opening or pressure release valve of the incubation chamber (17). (vi) The mixed sample was incubated at a suitable temperature (37° C.) for a suitable time period (10 min). (vii) 500 µl of rinsing solution (nanopure water) were drawn from the respective container (36) through the respective thin tube via the multi-port pump head (14) into the syringe pump (13). (viii) The rinsing solution was discarded through the respective thin tube via the multi-port pump head (14) into a waste container (23). (iv) Upon completion of incubation, the mixed liquid from the incubation chamber was transferred through the respective thin tube via the multi-port head (14) to the interface to the flow cytometer (16) needle. (x) The operating software then triggered the measurement of the flow cytometer and stopped it after the desired time/volume (100 sec/50 µl). (xi) The measured and incubated mixed liquid was transferred through the respective thin tube via the multi-port pump head (14) into a waste container (23). (xii) 500 µl of rinsing solution (nanopure water) were drawn from the respective container (36) through the respective thin tube via the multi-port head (14) into the syringe pump and further into the incubation chamber (17). (xiii) The rinsing solution was discarded through the respective thin tube via the multi-port pump head (14) and the syringe pump (13) into a waste container (23). (xiv) The rinsing step was repeated for the interface to the flow cytometer (16) needle.

The invention claimed is:

1. A method for producing individually processed liquid samples, the method comprising the steps:
   (a) providing a liquid sample processing device (20) comprising,
      a syringe plunger pump (13) positioned vertically and including a plunger (21) at the top and an opening (22) at the bottom, forming a plunger displacement space between the plunger (21) and the opening (22), wherein the opening (22) is operably coupled to a multiport pump head (14) that connects the syringe plunger pump (13) to:
         at least one sample inlet (7, 8) connected to at least one liquid sample source (19);
         at least one sample processing inlet (9-12) connected to at least one sample processing liquid source (36);
         at least one gas inlet (5,6); and
         at least one outlet (1, 2, 3, 4) for transferring fluids in the syringe plunger pump (13), the at least one outlet (1, 2, 3, 4) including a valve (24, 25, 26, 27) having a closed position and an open position;
   (b) loading at least one liquid sample through the multiport pump head (14) from one or more of the at least one liquid sample source (19) into the syringe plunger pump (13) of the liquid sample processing device (20) from one or more of the at least one liquid sample source (19);
   (c) loading at least one sample processing liquid through the multiport pump head from one or more of the at least one processing liquid source (19) into the syringe plunger pump (13) of the liquid sample processing device (20) from one or more of the sample processing liquid sources (36);
   (d) loading at least one gas bubble through the multiport pump head (14) into the syringe plunger pump (13) of the liquid sample processing device (20) from one or more of the at least one gas inlet (5,6), which floats a bubble through the liquids to the top of the syringe plunger pump (13), thus mixing the liquids in the syringe plunger pump (13) and accumulating at the top; and
   (e) transferring, when the valve is in an open position, mixed liquids followed by the gas bubble in the syringe plunger pump (13) through one or more of the at least one outlet (5-12) of the multiport pump head (14).

2. The method according to claim 1, wherein in step (e) the mixed liquids followed by the gas bubble are transferred together or sequentially from the syringe plunger pump (13) to an incubation device (17) that mixes the mixed liquids by floating a gas bubble through the mixed liquids.

3. The method according to claim 1, wherein in step (e), the mixed liquids followed by the gas bubble in the syringe plunger pump (13) are transferred through one or more of the outlets of the multiport pump head to a further device (16, 17).

4. The method according to claim 3, wherein the further device (16, 17) is a processing device, an incubating device, an analytical device, or combination thereof.

5. The method according to claim 1, further comprising step (f) assessing at least one of a physical property, a chemical property, a biological property, or a combination thereof, of the processed liquid samples.

6. The method according to claim 5, wherein the physical property, the chemical property, the biological property, or a combination thereof, of the processed liquid samples are assessed either within the syringe plunger pump (13), in a sample taken directly from the mixed liquids in the syringe plunger pump (13), or after transfer and further processing of the mixed liquids from the syringe plunger pump (13).

7. The method according to claim 5, wherein the physical property, the chemical property, the biological property, or a combination thereof, is assessed via an analytical device (16) that performs photo spectrometry, mass spectrometry, microscopy, cell counting, or flow cytometry.

8. The method according to claim 5, further comprising step (g) assessing at least one of a physical property, a chemical property, a biological property, or a combination thereof, of the processed samples, wherein the method comprises continuously mixing, incubating, and assessing a liquid sample by flow cytometry.

9. The method according to claim 1, wherein the multiport pump head further connects the syringe plunger pump (13) with at least one source for: one or more further sample processing liquid, a rinse liquid, a disinfection liquid, a cleaning liquid, or a combination thereof, and the method further comprises a step (f) of loading the further sample processing liquid, the rinse liquid, the disinfection liquid, the cleaning liquid, or a combination thereof through the multiport pump head from the respective source.

10. The method according to claim 5, further comprising a step (g) assessing a physical property, a chemical property, a biological property, or a combination thereof, of the processed and incubated liquid samples.

11. The method according to claim 10, wherein the physical property, the chemical property, the biological property, or a combination thereof, of the processed and incubated liquid samples are assessed either within the syringe plunger pump (13), in a sample taken directly from the mixed liquids in the syringe plunger pump (13), or after transfer and incubation of the mixed liquids from the syringe plunger pump (13).

12. The method of claim 1, wherein the liquid sample processing device (20) further comprises a control unit that controls the syringe plunger pump and the multiport pump head, wherein the control unit comprises software that operates the liquid sample processing device (20) to continuously process liquid samples.

13. The method of claim 5, wherein the liquid sample processing device (20) further comprises a control unit that controls the syringe plunger pump and the multiport pump head, wherein the control unit comprises software that operates the liquid sample processing device (20) to continuously process and assess liquid samples.

* * * * *